United States Patent
Yum et al.

(10) Patent No.: US 11,006,428 B2
(45) Date of Patent: May 11, 2021

(54) METHOD FOR INTERFERENCE MEASUREMENT IN WIRELESS COMMUNICATION SYSTEM AND APPARATUS FOR SAME

(71) Applicant: LG Electronics Inc., Seoul (KR)

(72) Inventors: Kunil Yum, Seoul (KR); Jiwon Kang, Seoul (KR); Kijun Kim, Seoul (KR); Jonghyun Park, Seoul (KR); Hyungtae Kim, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,757

(22) PCT Filed: Sep. 26, 2017

(86) PCT No.: PCT/KR2017/010599
§ 371 (c)(1),
(2) Date: Dec. 13, 2018

(87) PCT Pub. No.: WO2018/056784
PCT Pub. Date: Mar. 29, 2018

(65) Prior Publication Data
US 2019/0373614 A1    Dec. 5, 2019

Related U.S. Application Data

(60) Provisional application No. 62/553,143, filed on Sep. 1, 2017, provisional application No. 62/399,489, filed on Sep. 26, 2016.

(51) Int. Cl.
*H04W 72/08*  (2009.01)
*H04B 17/336*  (2015.01)
(Continued)

(52) U.S. Cl.
CPC ........ *H04W 72/082* (2013.01); *H04B 17/336* (2015.01); *H04W 24/10* (2013.01); *H04W 72/042* (2013.01); *H04W 72/0493* (2013.01)

(58) Field of Classification Search
CPC . H04W 72/082; H04W 72/08; H04W 72/085; H04W 72/087; H04W 72/10;
(Continued)

(56) References Cited

U.S. PATENT DOCUMENTS

2013/0322376 A1    12/2013  Marinier et al.
2014/0044040 A1    2/2014   Chen et al.
(Continued)

FOREIGN PATENT DOCUMENTS

JP    5456037        3/2014
JP    2015524641     8/2015
(Continued)

OTHER PUBLICATIONS

3GPP TS 36.213 V13.2.0, "3GPP: TSG RAN; Evolved Universal Terrestrial Radio Access (E-UTRA); Physical Layer Procedures (Release 13)", Jun. 30, 2016 (https://portal.3gpp.org/desktopmodules/Specifications/SpeciticationsDetails.aspx?specificationid=2427) See sections 7.2-7.2.6.
(Continued)

*Primary Examiner* — Peter Chen
(74) *Attorney, Agent, or Firm* — Fish & Richardson P.C.

(57) ABSTRACT

A method for measuring interference by a terminal in a wireless communication system according to one embodiment of the present invention may comprise the steps of: receiving interference measurement configuration information including a semi-persistence channel state information-interference (CSI-IM) configuration; receiving a request which indicates measurement of the semi-persistence CSI-IM configuration; and measuring the semi-persistence CSI-
(Continued)

IM configuration in response to the received request, wherein the semi-persistence CSI-IM configuration may indicate CSI-IM which is performed at predetermined periods during a predetermined time interval.

9 Claims, 11 Drawing Sheets

(51) Int. Cl.
*H04W 24/10* (2009.01)
*H04W 72/04* (2009.01)
(58) Field of Classification Search
CPC .............. H04W 72/04; H04W 72/042; H04W 72/0493; H04W 72/0446; H04W 72/0413; H04W 72/0406; H04W 24/10; H04W 88/02; H04B 17/336; H04B 17/318; H04B 17/345; H04B 7/0626; H04B 7/0632; H04L 5/0048; H04L 5/0053; H04L 5/0057; H04L 5/0051; H04L 5/005; H04L 1/0026
See application file for complete search history.

(56) References Cited

U.S. PATENT DOCUMENTS

| | | | | |
|---|---|---|---|---|
| 2014/0078919 | A1* | 3/2014 | Hammarwall | H04L 1/0028 370/252 |
| 2014/0092878 | A1* | 4/2014 | Davydov | H04L 1/1861 370/336 |
| 2014/0126402 | A1* | 5/2014 | Nam | H04W 24/08 370/252 |
| 2016/0197715 | A1 | 7/2016 | Papasakellariou et al. | |
| 2016/0212733 | A1* | 7/2016 | Davydov | H04B 7/0626 |
| 2017/0026866 | A1* | 1/2017 | Sandberg | H04B 7/0632 |

FOREIGN PATENT DOCUMENTS

| | | |
|---|---|---|
| JP | 2018501735 | 1/2018 |
| KR | 1020130108193 | 10/2013 |
| KR | 1020140099917 | 8/2014 |
| KR | 1020150103359 | 9/2015 |
| KR | 1020160055060 | 5/2016 |
| KR | 1020160093533 | 8/2016 |
| WO | WO2015167250 | 11/2015 |
| WO | WO2016126099 | 8/2016 |

OTHER PUBLICATIONS

International Search Report and Written Opinion in International Application No. PCT/KR2017/010599, dated Jan. 11, 2018, 10 pages.
Ericsson, "Dynamic CSI framework," R1-167461, 3GPP TSG-RAN WG1 #86, Göteborg, Sweden, Aug. 22-26, 2016, 5 pages.
Ericsson, "Unified CSI reporting framework," R1-167462, 3GPP TSG-RAN WG1 #86, Göteborg, Sweden, Aug. 22-26, 2016, 4 pages.
Huawei, HiSilicon, "WF on CSI measurement and reporting in NR," R1-167965; 3GPP TSG RAN WG1 Meeting #86, Agenda item: 8.1.5, Gothenburg, Sweden, Aug. 22-26, 2016, 4 pages.
LG, InterDigital, Intel, Huawei, "WF on CSI timing relationship," R1-168135, 3GPP TSGRAN1 #86, Agenda Item: 8.1.5, Gothenburg, Sweden, Aug. 22-26, 2016, 3 pages.
Samsung, Ericsson, Qualcomm, "WF on periodic and semi-persistant CSI for NR," R1-168186, 3GPP TSG RAN WG1 Meeting #86, Agenda item: 8.1.5, Gothenburg, Sweden, Aug. 22-26, 2016, 2 pages.
3rd Generation Partnership Project; Technical Specification Group Radio Access Network; "Evolved Universal Terrestrial Radio Access (E-UTRA); Physical channels and modulation (Release 13)," 3GPP TS 36.211 V13.2.0, dated Jun. 2016, 168 pages, XP051123204.
3rd Generation Partnership Project; Technical Specification Group Radio Access Network; "Evolved Universal Terrestrial Radio Access (E-UTRA); Physical layer procedures (Release 13)", 3GPP TS 36.213, dated Jun. 2016, pp. 45-254, XP051123185.
Extended European Search Report in European Application No. 17853498.8, dated Jan. 2, 2020, 16 pages.
LG Electronics, "Discussion on CSI measurement framework," R1-1611822, 3GPP TSG RAN WG1 Meeting #87, Reno, USA, dated Nov. 14-18, 2016, 6 pages, XP051190171.
LG Electronics, "Discussion on CSI timing," R1-1700473, 3GPP TSG RAN WG1 NR Ad-Hoc Meeting, Spokane, USA, dated Jan. 16-20, 2017, 5 pages, XP051202897.
LG Electronics, "Discussion on interference measurement for NR," R1-1609254, 3GPP TSG RAN WG1 Meeting #86b, Lisbon, Portugal, dated Oct. 10-14, 2016, 5 pages, XP051159366.
LG Electronics, "Remaining details on beamformed CSI-RS enhancements," R1-166841, 3GPP TSG RAN WG1 Meeting #86, Gothenburg, Sweden, dated Aug. 22-26, 2016, 5 pages, XP051125585.
Samsung, "Enhancement on Full-Dimension (FD) MIMO for LTE," RP-161687, 3GPP TSG RAN Meeting #73, New Orleans, USA, dated Jun. 19-22, 2016, 9 pages, XP051662241.
ZTE Corporation, ZTE Microelectronics, "Aperiodic CSI for NR MIMO," R1-166218, 3GPP TSG RAN WG1 Meeting #86, Gothenburg, Sweden, dated Aug. 22-26, 2016, 4 pages, XP051140123.
LG Electronics, "Discussion on CSI-RS design and CSI procedure," R1-166901, 3GPP TSG RAN WG1 Meeting #86, Gothenburg, Sweden, dated Aug. 22-26, 2016, 5 pages.
Japanese Office Action in Japanese Application No. 2019-516448, dated Jun. 9, 2020, 6 pages (with English translation).
LG Electronics, "Discussion on CSI measurement," R1-1715857, 3GPP TSG RAN WG1 Meeting NR#3, Nagoya, Japan, dated Sep. 18-21, 2017, 7 pages.
KR Office Action in Korean Application No. 10-2019-7034398, dated Mar. 4, 2020, 4 pages (with English translation).
Qualcomm Incorporated, "Enhancements on Beamformed CSI-RS", R1-166270, 3GPP TSG-RAN WG1 #86, Aug. 22-26, 2016, Gothenburg, Sweden, 4 pages.
Japanese Office Action in Japanese Appln. No. 2019-516448, dated Jan. 5, 2021, 7 pages (with English translation).

* cited by examiner

METHOD FOR INTERFERENCE MEASUREMENT IN WIRELESS COMMUNICATION SYSTEM AND APPARATUS FOR SAME

CROSS-REFERENCE TO RELATED APPLICATIONS

This application is a National Stage application under 35 U.S.C. § 371 of International Application No. PCT/KR2017/010599, filed pm Sep. 26, 2017, which claims the benefit of U.S. Provisional Application No. 62/553,143, filed on Sep. 1, 2017, and U.S. Provisional Application No. 62/399,489, filed on Sep. 26, 2016. The disclosures of the prior applications are incorporated by reference in their entirety.

TECHNICAL FIELD

The present disclosure relates to a wireless communication system, and more particularly, to a method and apparatus for measuring interference.

BACKGROUND ART

As more and more communication devices require larger communication capacities, there is a need for enhanced mobile broadband communication (eMBB), compared to legacy radio access technologies (RATs). In addition, massive machine type communications (mMTC) which connects multiple devices and objects to one another to provide various services at any time in any place is one of main issues to be considered for future-generation communications. Besides, a communication system design which considers services sensitive to reliability and latency is under discussion. As such, the introduction of a future-generation RAT in consideration of eMBB, mMTC, ultra-reliable and low-latency communication (URLLC), and so on is under discussion. In the present disclosure, this technology is referred to as New RAT, for the convenience's sake.

DISCLOSURE

Technical Problem

The present disclosure is intended to propose a method for measuring interference. More particularly, the present disclosure is intended to propose a method for measuring interference.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method for measuring interference in a wireless communication system, performed by a terminal may include receiving interference measurement configuration information including a semi-persistent channel state information-interference measurement (CSI-IM) configuration, receiving a request indicating measurement for the semi-persistent CSI-IM configuration, and performing measurement for the semi-persistent CSI-IM configuration according to the received request. The semi-persistent CSI-IM configuration may indicate CSI-IM with a predetermined period for a predetermined time period.

Additionally or alternatively, the method may further include receiving information about a time point when the terminal starts the measurement for the semi-persistent CSI-IM configuration.

Additionally or alternatively, an indication of the measurement for the semi-persistent CSI-IM configuration may include a CSI report request or may be received together with the CSI report request.

Additionally or alternatively, the CSI report request may indicate termination, deactivation, or off of the semi-persistent CSI-IM configuration.

Additionally or alternatively, the method may further include receiving information about a power compensation value related to the semi-persistent CSI-IM configuration.

Additionally or alternatively, in the case where it is determined that the measurement for the semi-persistent CSI-IM configuration is to be reported in a subframe m+k after a predetermined number of (k) subframes from a subframe m in which the indication of the measurement for the semi-persistent CSI-IM configuration is received, when the indication of the measurement for the semi-persistent CSI-IM configuration is received before a CSI report request is received, a report of measurement for the semi-persistent CSI-IM configuration corresponding to a CSI report request received in subframe m+k or a subsequent subframe may be omitted.

According to another embodiment of the present disclosure, a terminal for measuring interference in a wireless communication system may include a transmitter and a receiver, and a processor configured to control the transmitter and the receiver. The processor may be configured to receive interference measurement configuration information including a semi-persistent channel state information-interference measurement (CSI-IM) configuration, to receive a request indicating measurement for the semi-persistent CSI-IM configuration, and to perform measurement for the semi-persistent CSI-IM configuration according to the received request. The semi-persistent CSI-IM configuration may indicate CSI-IM with a predetermined period for a predetermined time period.

Additionally or alternatively, the processor may be configured to receive information about a time point when the terminal starts the measurement for the semi-persistent CSI-IM configuration.

Additionally or alternatively, an indication of the measurement for the semi-persistent CSI-IM configuration may include a CSI report request or may be received together with the CSI report request.

Additionally or alternatively, the CSI report request may indicate termination, deactivation, or off of the semi-persistent CSI-IM configuration.

Additionally or alternatively, the processor may be configured to receive information about a power compensation value related to the semi-persistent CSI-IM configuration.

Additionally or alternatively, in the case where it is determined that the measurement for the semi-persistent CSI-IM configuration is to be reported in a subframe m+k after a predetermined number of (k) subframes from a subframe m in which the indication of the measurement for the semi-persistent CSI-IM configuration is received, when the indication of the measurement for the semi-persistent CSI-IM configuration is received before a CSI report request is received, a report of measurement for the semi-persistent CSI-IM configuration corresponding to a CSI report request received in the subframe m+k or a subsequent subframe may be omitted.

The foregoing solutions are merely a part of the embodiments of the present disclosure, and those skilled in the art could derive and understand various embodiments reflecting the technical features of the present disclosure from the following detailed description of the present disclosure.

Advantageous Effects

According to the embodiments of the present disclosure, interference may be efficiently measured.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
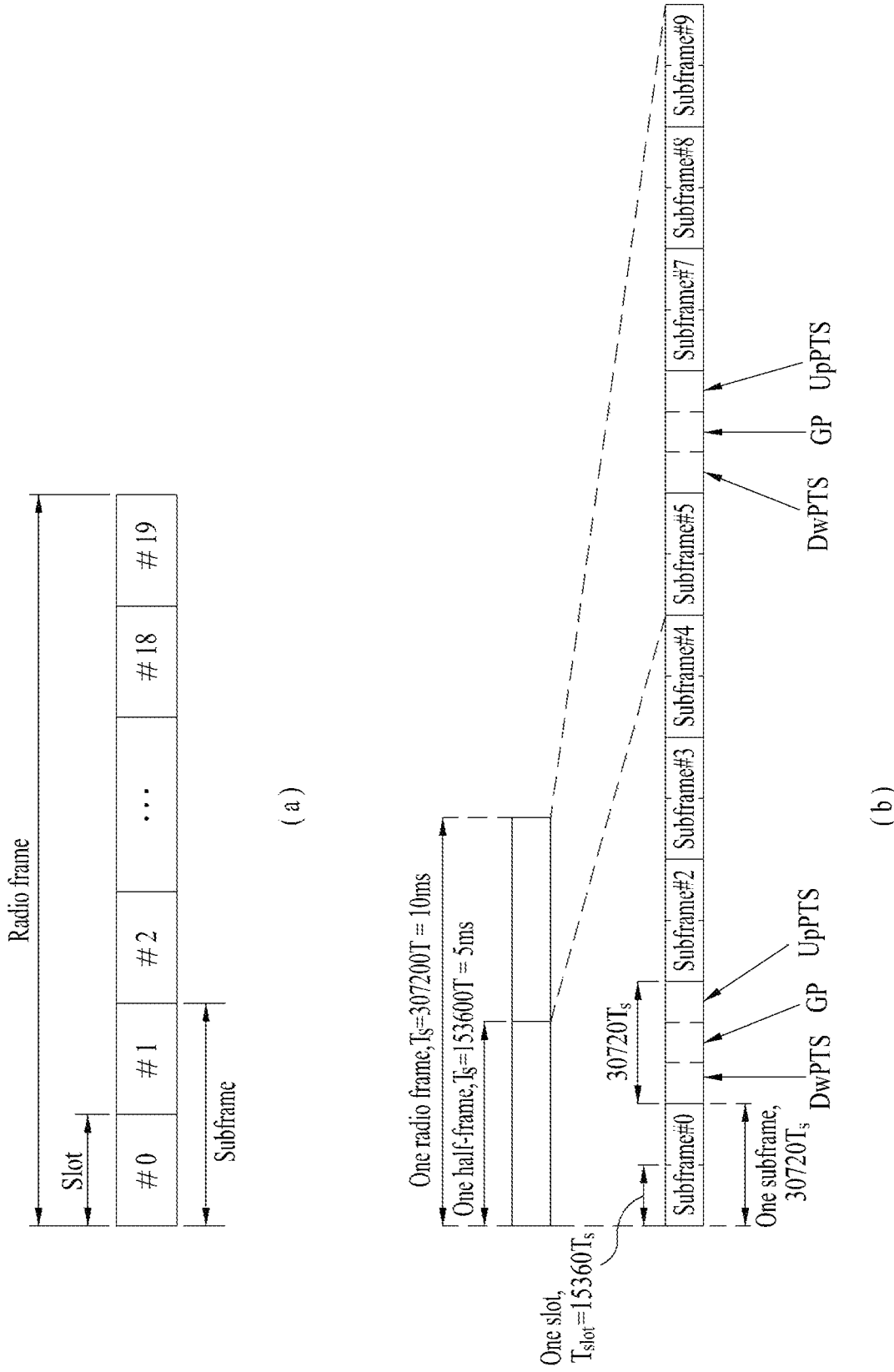
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.)

since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · $T_s$ |              |              |
| 8 | 24144 · $T_s$ |              |              | —             | —            | —            |
| 9 | 13168 · $T_s$ |              |              | —             | —            | —            |

Figure 2:
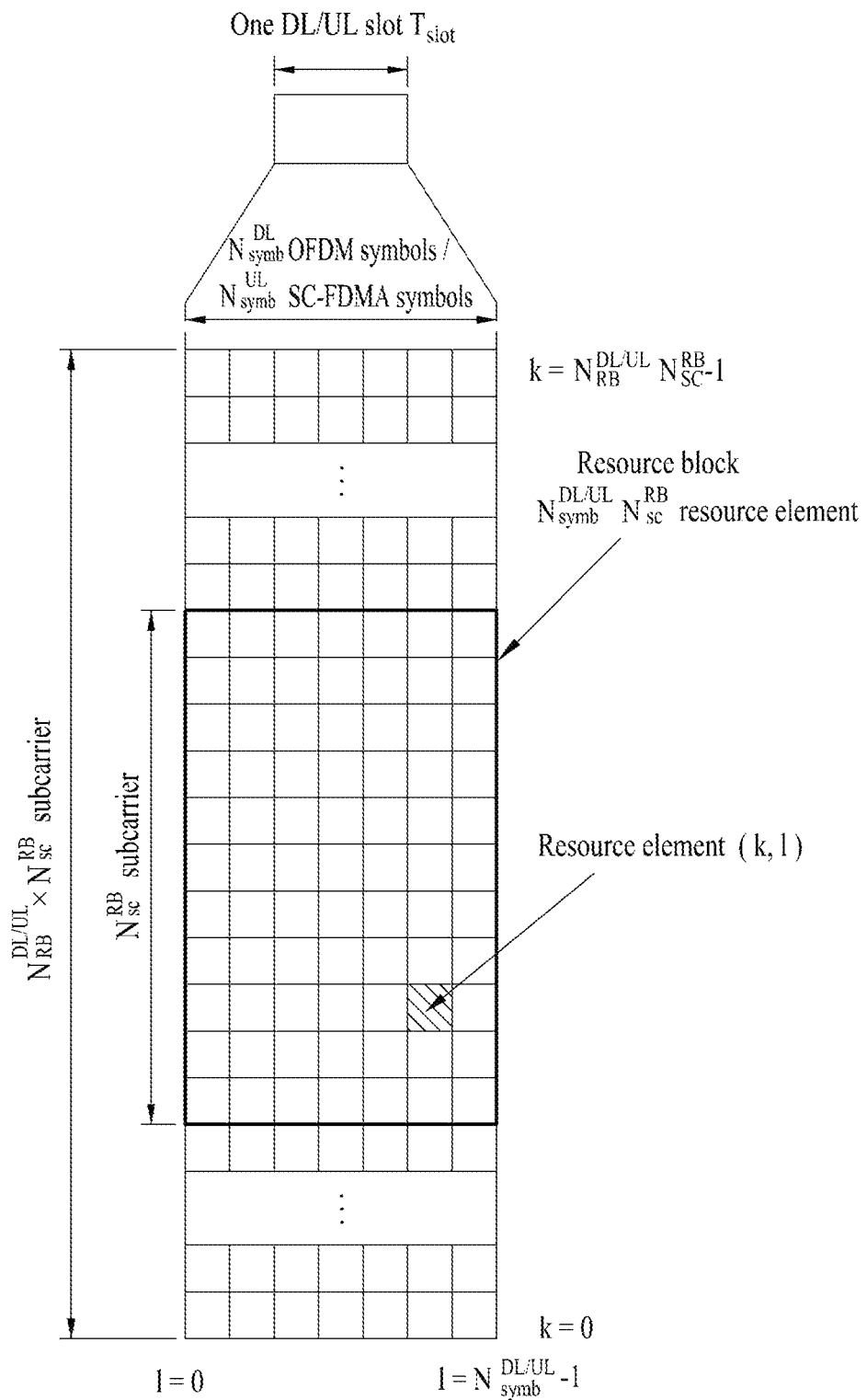
FIG. 2 illustrates an exemplary downlink/uplink (DL/UL) slot structure in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}$*$N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}$*$N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}$*$N_{sc}^{RB}$ REs. Each RE in a resource grid can be uniquely defined by an index pair (k, l) in a slot. Here, k is an index in the range of 0 to $N_{symb}^{DL/UL}$*$N_{sc}^{RB}$−1 in the frequency domain and l is an index in the range of 0 to $N_{symb}^{DL/UL}$−1.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}$−1, and $N_{VRB}^{DL}$=$N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
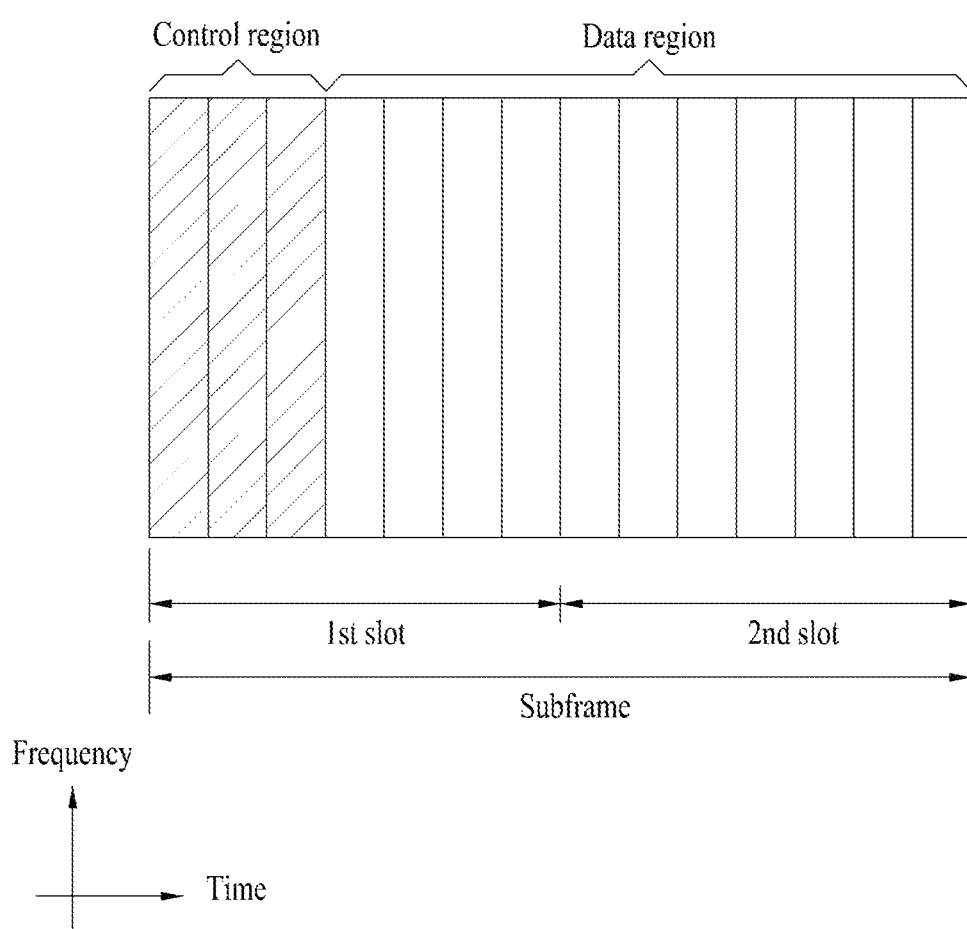
FIG. 3 illustrates an exemplary DL subframe structure in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four)

OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
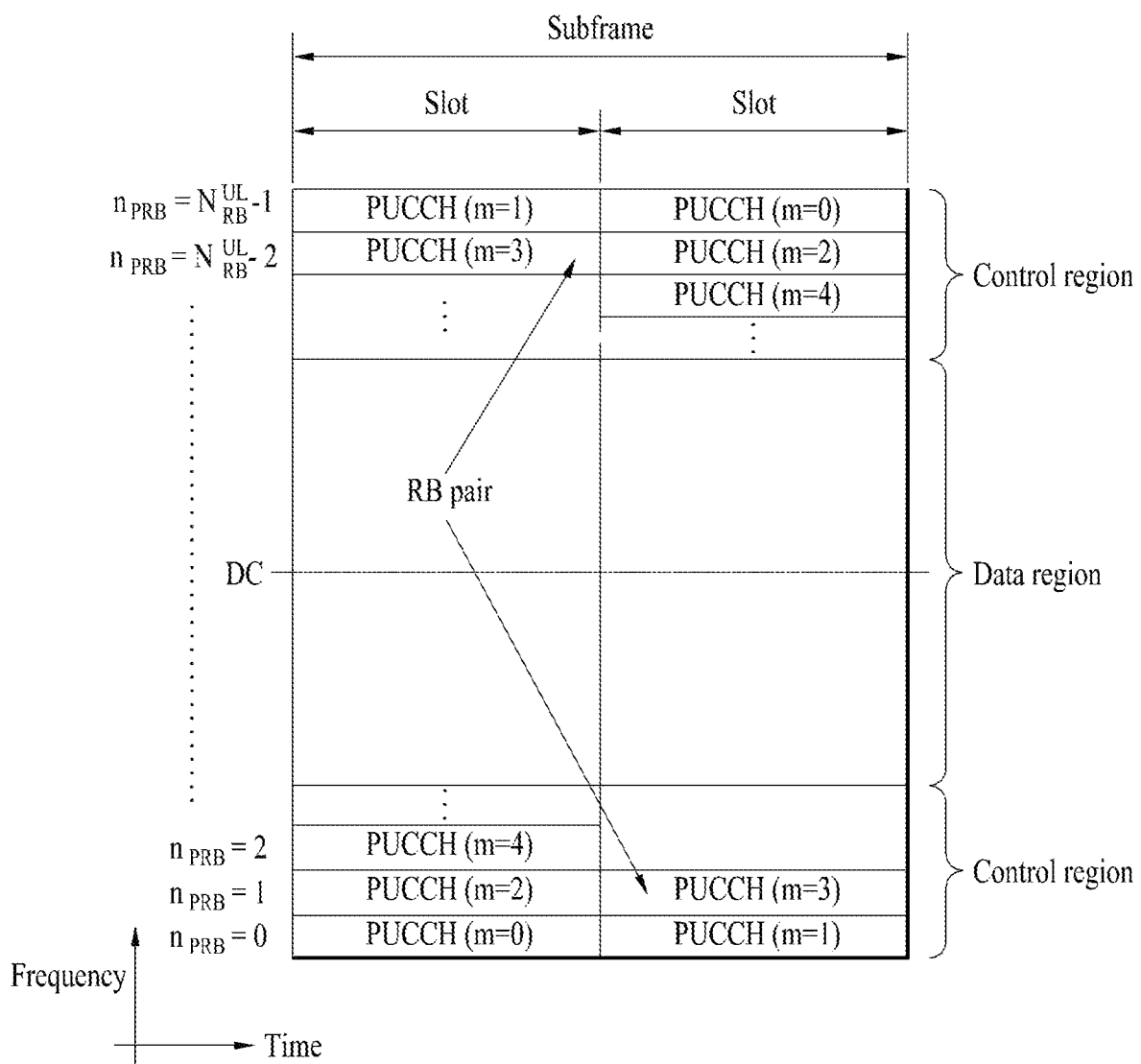
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, it is defined that a UE reports CSI to a BS. CSI generically refers to information representing the quality of a radio channel (or link) established between a UE and an antenna port. For example, the CSI corresponds to a rank indicator (RI), a precoding matrix indicator (PMI), a channel quality indicator (CQI), and so on. The RI represents information about the rank of a channel, which means the number of streams that the UE receives in the same time-frequency resources. Since the RI depends on the long-term fading of the channel, the UE generally feeds back the RI to the BS in a longer period. The PMI is a value reflecting a channel space property, representing a UE-preferred precoding index based on a metric such as an SINR or the like. The CQI represents a channel strength, generally meaning a reception SINR that may be obtained when the BS uses a PMI.

Based on the measurement of the radio channel, the UE calculates a preferred PMI and RI which may offer an optimum or highest transmission rate, when used in the BS in a current channel state, and feeds back the calculated PMI and RI to the BS. The CQI refers to a modulation and coding scheme which provides an acceptable packet error probability for the feedback PMI/RI.

Overview of Channel State Information-Interference Measurement (CSI-IM)

[CSI-RS Resources]

For a serving cell and a UE set to TM 1 to TM 9, one CSI-RS resource configuration may be configured for the UE. For a serving cell and a UE set to TM 10, one or more CSI-RS resource configurations may be configured for the UE. The following parameters for which the UE should assume non-zero transmission power for a CSI-RS are configured for each CSI-RS resource configuration by higher-layer signaling.

CSI-RS resource configuration ID

The number of CSI-RS ports

CSI-RS subframe configuration $I_{CSI-RS}$

UE assumption for reference PDSCH transmitted power $P_c$ for a CSI feedback in each CSI process. If CSI subframe sets $C_{CSI,0}$ and $C_{CSI,1}$ are configured for a CSI process by higher layers, $P_c$ is configured for each CSI subframe set of the CSI process.

Pseudo-random sequence generation parameter, $n_{ID}$

UE assumption of quasi co-located (QCL) type B for CRS antenna ports and CSI-RS antenna ports, based on the following parameters.

Cell ID for QCL-assumed CRS

The number of CRS antenna ports for QCL-assumed CRS

MBSFN subframe configuration for QCL-assumed CRS

[Zero-Power CSI-RS Resources]

For a serving cell and a UE set to TM 1 to TM 9, if regarding the serving cell, csi-SubframePatternConfig-r12 is not configured for the UE, one zero-power CSI-RS (ZP CSI-RS) resource configuration may be configured for the UE. Herein, csi-SubframePatternConfig-r12 is a configuration related to a subframe subset for CSI measurement.

Further, for a serving cell and a UE set to TM 1 to TM 9, if regarding the service cell, csi-SubframePatternConfig-r12 is configured for the UE, up to two ZP CSI-RS resource configurations may be configured for the UE.

For a serving cell and a UE set to TM 10, one or more ZP CSI-RS resource configurations may be configured for the UE. The following parameters are configured for one or more ZP CSI-RS resource configurations by higher-layer signaling.

ZP CSI-RS configuration list (16-bit bitmap)

ZP CSI-RS subframe configuration $I_{CSI-RS}$

[CSI-IM (Interference Measurement)]

For CSI-IM, a part of ZP CSI-RS resources are used. The position of a CSI-IM resource corresponding to the part of the ZP CSI-RS resources is indicated to a UE, so that the UE may measure interference in the resource position.

In TM 10, one or more CSI processes may be configured per serving cell for the UE by a higher layer(s). Each CSI process is associated with CSI-RS resources and CSI-IM resources. CSI reported by the UE corresponds to a CSI process configured by the higher layer(s), and each CSI process may be configured along with or without a PMI/RI by higher-layer signaling.

The following parameters are configured in each CSI-IM resource configuration by higher-layer signaling.

ZP CSI-RS configuration

ZP CSI-RS subframe configuration $I_{CSI-RS}$

The UE does not receive a CSI-IM resource configuration(s) which is not fully overlapped with one ZP CSI-RS configuration configurable for the UE. Further, the UE does not receive a CSI-IM resource configuration which is not fully overlapped with one of ZP CSI-RS resource configurations.

In order to efficiently measure interference for a MIMO/multi-user operation between a BS and a UE, which have multiple antennas in a full dimension (FD)-MIMO environment and New Rat (NR), when a plurality of interference measurement resources (IMRs) are to be configured and used in one CSI process, the present disclosure proposes a method for configuring the IMRs, a signaling and operation in the case of using the IMRs in an on-demand manner, and a reporting signaling and operation in the case where CSI is to be calculated and reported in consideration of interference measured in the IMRs.

In enhanced FD-MIMO (eFD-MIMO), up to 64 transmission antenna ports are under consideration, instead of up to 8 transmission antenna ports used in up to legacy LTE-A. Along with the progress to NR-MIMO, the number of transmission antenna ports will be maintained or increased. In this case, the increase of REs allocated to CSI-RSs for CSI measurement leads to an increase in overhead. Thus, there is a need for a method for reducing the overhead. For this purpose, instead of periodic CSI-RS transmission, CSI-RS transmission for CSI calculation at a UE, only when needed, that is, aperiodic CSI-RS is considered. Accordingly, an aperiodic IMR is needed for use in an aperiodic CSI-RS.

Further, to support UEs on the increase, MU-MIMO performance is considered to be more significant in NR. For this purpose, it is important to measure the effect of mutual interference between UEs in MU. Particularly, there is a need for measuring new interference between UEs using different analog beams. To measure these various types of interference, more IMRs than used in the legacy LTE need to be configured.

However, NR is developed toward reduction of as much always-on signaling as possible. Further, to reduce the overhead of CSI-IM, aperiodic IMR is preferably used in an on-demand manner (i.e., only when a BS actually needs interference measurement, an IMR is measured), instead of the legacy periodic IMR.

Accordingly, the present disclosure proposes a method for configuring a plurality of CSI-IMs for aperiodic CSI-IM, a signaling and operation for using the CSI-IMs, and a signaling and operation for calculating and reporting CSI in consideration of interference measured in the CSI-IMs.

The term BS used in the present disclosure may be applied to transmission and reception points such as a cell, an eNB, a sector, a transmission point (TP), a reception point (RP), a remote radio head (RRH), a relay, and so on. Further, the term is used comprehensively to distinguish component carriers (CCs) in a specific transmission and reception point. Particularly, as a BS, a point of performing a DL/UL transmission to a UE may be referred to as a transmission and reception point (TRP). The TRP may correspond to a specific physical cell, a group of plurality of physical cells, a specific analog beam, or a specific beam group. Hereinbelow, an antenna port refers to a virtual antenna element for which the same channel characteristics (e.g., delay profile, Doppler spread, and so on) may be assumed (within at least the same RB). Hereinbelow, a subframe (SF) refers to a repeated transmission unit having a predetermined time length. According to a numerology, an SF may be defined differently.

In the present disclosure, although the terms CSI-RS and CSI-IM are used for the convenience' sake, they may refer to an RS for CSI measurement and an RS for interference measurement, respectively in NR-MIMO.

Now, a proposed method will be described based on a 3GPP LTE system, for the convenience of description. However, the proposed method may be extended to other systems (e.g., NR, UTRA, and so on) than the 3GPP LTE system.

Further, as described before, since a CSI-IM configuration includes information about resources for interference measurement, it will be obvious to those skilled in the art that "CSI-IM" refers to corresponding resources and/or all information related to the resources.

The current LTE 36.331 defines a CSI-IM configuration as follows.

---

CSI-IM-Config information elements
--ASN1START
CSI-IM-Config-r11 ::=SEQUENCE {
csi-IM-ConfigId-r11 CSI-IM-ConfigId-r11,
resourceConfig-r11 INTEGER (0..31),
subframeConfig-r11 INTEGER (0..154),
...,
[[interferenceMeasRestriction-r13 BOOLEAN OPTIONAL-Need ON
]]
}
CSI-IM-ConfigExt-r12::=SEQUENCE {
csi-IM-ConfigId-v1250 CSI-IM-ConfigId-v1250,
resourceConfig-r12 INTEGER (0..31),
subframeConfig-r12 INTEGER (0..154),
...,
[[interferenceMeasRestriction-r13 BOOLEAN OPTIONAL-Need ON
csi-IM-ConfigId-v1310 CSI-IM-ConfigId-v1310 OPTIONAL-Need ON
]]
}
--ASN1STOP

---

That is, csi-IM-Config includes csi-IM-ConfigId, resourceConfig indicating an RE pattern of IMRs in an RB, and subframeConfig indicating a transmission period and an offset. Particularly, the RE pattern is one of 4-port CSI-RS patterns. As one csi-IM-ConfigId is defined in a CSI process, the CSI process includes one CSI-IM.

Aperiodic CSI-IM may be classified into one-shot CSI IM and semi-persistent CSI-IM. The one-shot CSI IM is a scheme in which one-time CSI-IM measurement (e.g., in one subframe) is indicated by a CSI-IM measurement indication transmitted to a UE, whereas the semi-persistent CSI-IM is an aperiodic CSI-IM performed by periodically indicating CSI-IM measurement for a predetermined time to a UE by L1/L2 signaling such as enable/disable. The semi-persistent CSI-IM configuration may be similar to the above csi-IM-Config. However, in this case, only a transmission period may be set without an offset. If one resource is to be used commonly for one-shot CSI-IM and semi-persistent CSI-IM, a transmission period should be set per CSI-IM, or a period should be set for the whole CSI-IMs.

In an aperiodic CSI-IM configuration, especially a one-shot CSI-IM configuration, a transmission period and an offset are not defined, and in different aperiodic CSI-IMs (one-shot CSI-IMs), measurement results are not averaged (i.e., in the case of measurement restriction (MR) on, interference measurement results are not averaged across a subframe(s) or slot(s), whereas in the case of MR off, interference measurement results are averaged across a subframe(s) or slot(s)). For example, in FD-MIMO, subframeConfig among the above-described parameters is not configured, and the eNB indicates whether a CSI-IM is to be measured, and if it is to be measured, which CSI-IM is to be measured to the UE by later-described signaling. Likewise, a transmission period and an offset may not be configured in an aperiodic CSI-IM (one-shot CSI-IM) configuration in NR-MIMO.

In addition to the legacy CSI-IM, interference CSI-RS (ICSI-RS) will be described in the present disclosure. The legacy CSI-IM refers to an IMR for which a scheme of measuring and reporting interference power (e.g., direct reporting of an interference-based CQI or interference) is used, like a ZP CSI-RS in LTE, whereas the ICSI-RS refers to an IMR for which a scheme of measuring an interference channel using a sequence set in the corresponding resources and transmitting a related interference report (e.g., reporting the eigenvector of the interference channel) is used, like a non-ZP CSI-RS. That is, the ICSI-RS may include a sequence-related configuration such as a sequence initialization factor or the like in a CSI-IM. More specifically, the ZP CSI-RS-based IMR used in the legacy LTE corresponds to a CSI-IM scheme, and a later-described NZP CSI-RS-based IMR may be used for both schemes (CSI-IM and ICSI-RS).

Unless specified otherwise, aperiodic CSI-IM covers both one-shot CSI-IM and semi-persistent CSI-IM, and CSI-IM covers both CSI-IM for interference power measurement, and ICSI-RS for interference channel measurement. In practice, if additional information is not needed in detecting an NZP CSI-RS sequence (e.g., all cell IDs have a common initialization factor), a configuration with no distinction between the two resources may be used from the perspective of configuration.

3.1 Plural Aperiodic CSI-IM Configurations with L3 Signaling

In the present disclosure, a scenario of using a plurality of IMRs in calculating/reporting CSI is considered. To measure and report CSI for a plurality of interference assumptions, the eNB needs to configure a plurality of IMRs. This is intended to measure more types of interference than used conventionally in order to measure interference with a plurality of co-scheduled UEs in an MU-MIMO situation or measure interference between beams for the purpose of supporting a transmission method using a plurality of analog/digital beams.

Alt. 1 Plural Aperiodic CSI-IM Configurations

The eNB may configure a plurality of aperiodic CSI-IM configurations in one CSI process for the UE. In FD-MIMO, for example, M (M>=1) csi-IM-ConfigIDs may be configured in one CSI process, and thus M aperiodic CSI-IM configurations may be configured. Or although one csi-IM-ConfigID is configured in one CSI process in order to simplify RRC signaling, M configurations, for example, RE patterns may be configured in csi-IM-Config corresponding to the ID. Further, in this case, each CSI-IM configuration may be configured as one-shot CSI-RS or periodic or semi-persistent CSI-IM. In other words, a period and an offset may be configured (periodic) as in subframeConfig, only a period may be configured (semi-persistent), or none of a period and an offset may be configured (one-shot), in each CSI-IM configuration.

If aperiodic CSI-IM is also configured by higher-layer signaling such as RRC signaling in NR-MIMO, M distinguished aperiodic CSI-IM configurations may be configured in one CSI process (or an equivalent configuration) as in FD-MIMO. These configurations may be distinguished by configurations of independent RE patterns and/or periods.

An antenna port configuration such as antennaPortsCount may be used in each aperiodic CSI-IM configuration. The antenna port configuration may lead to more accurate configuration of resources. Further, the antenna port configuration may be replaced with the use of the same antenna port numbers as configured for CSI-RSs.

Alt. 2 Bitmap Indication of Aperiodic CSI-IM Resource

The eNB indicates to the UE M resources to be used as IMRs from a set of a plurality of predefined aperiodic CSI-IM resource sets, in the form of a bitmap by higher-layer signaling such as RRC signaling. In this case, bits are mapped to aperiodic CSI-IM configurations in a one-to-one correspondence (e.g., the bits are mapped to the aperiodic CSI-IM configurations sequentially in the order of the aperiodic CSI-IM configurations, from the least significant bit (LSB)), and a corresponding bit is signaled as 1 so that resources corresponding to the bit may be used. For example, if 10 aperiodic CSI-IM resources are defined in an FD-MIMO situation, and the UE is to measure interference in $2^{nd}$, $3^{rd}$ and $5^{th}$ aperiodic CSI-IM resources, a 10-bit bitmap of 0110100000 may be indicated to the UE by RRC signaling. The maximum number of aperiodic CSI-IM resources, $M_{max}$ available for the UE may be predefined. In this case, if later-described activation of L2 signaling is not used, $M_{max}$ may be set to a value equal to or less than $2^{nIMR}$ with respect to the number $n_{IMR}$ of bits in an aperiodic CSI-IM resource indication field of DCI, as described later. The aperiodic CSI-IM resource indication field may include a signaling state indicating that an aperiodic CSI-IM is not measured.

In this case, a CSI-IM resource set should be predefined. For the CSI-IM resource set, a CSI-RS resource set may be shared. Further, a plurality of different IMR resource sets may be defined according to antenna ports. To do so, an antenna port configuration such as antennaPortsCount may be used in the CSI-IM configuration. Further, the antenna port configuration may be replaced with the use of the same value as the number of antenna ports configured for CSI-RSs.

One-shot/semi-persistent CSI-IM resources may be defined separately. In other words, as bitmaps for CSI-IM configurations, two bitmaps may be defined for a one-shot CSI-IM configuration and a semi-persistent CSI-IM configuration, and a period may additionally be configured in the semi-persistent CSI-IM configuration.

Figure 5:
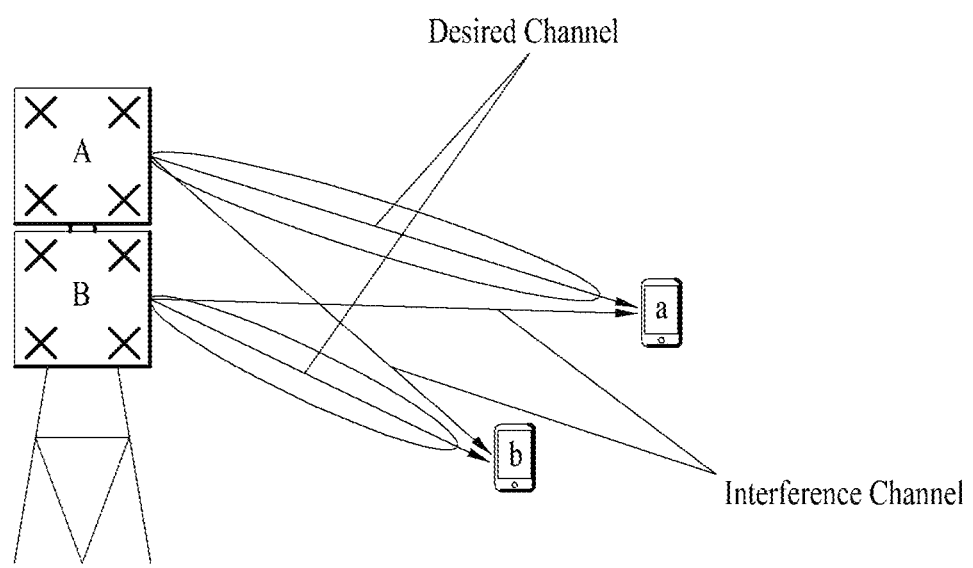
FIG. 5 illustrates interference channels.

Commonly to Alt 1 and Alt 2 described above, for an explicit feedback for an interference channel, an aperiodic CSI-IM beam similar to an NZP-CSI-RS, which brings about an effect identical or similar to interference may be transmitted in an aperiodic CSI-IM, and a UE supposed to measure interference may measure the aperiodic CSI-IM beam (i.e., the NZP-CSI-RS), thereby acquiring information about the interference channel. If the eNB intends to manage interference between UEs allocated to different analog beams, and the eNB/UEs are capable of using an explicit feedback, a desired channel (see FIG. 5) of each UE may be measured but an interference channel (see FIG. 5) may not be measured, with an explicit feedback of the desired channel. Accordingly, direct measurement of an interference channel may be very helpful for accurate interference handling in the eNB.

Further, if the UE wants to autonomously cancel interference by using an advanced receiver, it is preferred that the UE measures an accurate interference channel.

For this purpose, a kind of CSI-IM beam index may be used in generating an aperiodic CSI-IM sequence, and indicated to the UE by higher-layer signaling such as RRC signaling. The UE may measure information about a corresponding interference channel by receiving the aperiodic CSI-IM sequence, using the corresponding aperiodic CSI-IM beam index. If aperiodic CSI-IM configurations are limited to one CSI-IM configuration, a CSI-IM beam index may be replaced with a cell ID. Or initialization may be performed by using the same parameter as used for a CSI-RS, which is viable when a CSI-RS and a CSI-IM, and a plurality of CSI-IMs can be distinguished from each other (e.g., the position of a field in DCI) by means of a CSI-RS indicator or a CSI-IM indicator.

If a CSI-RS beam for another UE is transmitted in an aperiodic CSI-IM resource, for interference measurement, the CSI-IM beam index may be replaced with the index of the transmitted CSI-RS beam (or an equivalent sequence initialization parameter, for example, a cell ID). In this case, for each analog beam (or similarly, a digital beam covering a different spatial resource, applied to a CSI-RS), a kind of 'beam index' is given along with or instead of a cell ID for a CSI-RS sequence, and the CSI-RS sequence should be initialized by using the cell ID along with the beam index or using the beam index. That is, CSI-RS sequences transmitted on different analog beams should be initialized by 'beam indexes' along with or instead of cell IDs.

Commonly to Alt 1 and Alt 2 described before, a power indicator 'p_D' similar to p_C may be configured. p_D indicates a power assumption used when the power of a CSI-IM beam transmitted by the eNB is actually applied to CSI calculation. Particularly, when a CSI-RS for another UE is transmitted boosted, p_D may be used to compensate for the power boosting in using the CSI-RS as interference for CSI calculation. Aside from this example, the eNB may set a corresponding value for the UE so that CSI may be actually calculated by compensating the power of a transmitted CSI-IM. This power indicator or a power boostrelated value may be defined for each resource in Alt 1, and may be applied commonly to all aperiodic CSI-IMs in Alt 2.

The eNB may configure a kind of 'interference CSI-RS (ICSI-RS)' for the UE by including the above-described CSI-IM beam initialization factor (i.e., beam index), and when needed, p_D in a specific CSI-IM configuration. Or for more flexibility, the above-described CSI-IM beam initialization factor (i.e., beam index), and when needed, p_D may be configured to be used for all CSI-IMs. In this case, whether a specific CSI-IM resource uses the corresponding configuration, that is, is used as an ICSI-RS may be indicated to the UE by L1/L2 signaling.

If p_D is not configured separately, and a corresponding CSI-IM is configured as an NZP CSI-RS for channel measurement, p_C configured for the corresponding resource may be used as an interference power indicator p_C.

Alt 3. Resource Set Only

The eNB may configure only a resource set available for aperiodic CSI-IM, instead of an aperiodic CSI-IM configuration by L3 signaling. This means that interference is measured in a corresponding resource by L1 signaling (e.g., DCI) in L2 signaling-based selection or L1 signaling-based selection. Different resource sets may be defined according to numbers of antenna ports. In this case, to use semi-persistent CSI-IM, a common period configuration should be given, or for additional flexibility, period-related information should be given by later-described DCI signaling.

In this case, a CSI-IM beam initialization factor (i.e., beam index) and when needed, p_D may also be configured for use in total CSI-IMs as in Alt 2. In this case, it may be indicated to the UE by L1/L2 signaling whether a specific CSI-IM resource uses the corresponding configuration, that is, the specific CSI-IM resource is used as an ICSI-RS.

The above L3 signaling-based CSI-IM configuration method is a method for configuring a CSI-IM resource candidate that the UE may select by L2/L1 signaling such as MAC signaling/DCI as described below. If as many aperiodic CSI-IM resources as to be handled are predetermined by DCI signaling (i.e., M=K) in an L3 signaling procedure, the later-described L2 signaling-based resource selection procedure may not be used.

3.2. Aperiodic CSI-IM Resource Selection with L2 Signaling

If M aperiodic CSI-IM configurations more than aperiodic CSI-IM configurations which can be signaled by a DCI field as later described in Dynamic Signaling are defined, as many aperiodic CSI-IM configurations as can be handled by DCI as described later in Dynamic Signaling, that is, K aperiodic CSI-IM resources from among the aperiodic CSI-IM configurations configured by L3 signaling may be indicated by L2 signaling. The K aperiodic CSI-IM resources may be indicated in the form of a bitmap of $\lfloor \log_2(M) \rfloor$ bits. In this case, the bits may be mapped to the configured aperiodic CSI-IMs in a one-to-one correspondence (e.g., sequentially from the LSB in the order of the aperiodic CSI-IM configurations), and corresponding bits may be signaled as 1 so that corresponding resources are used.

Particularly in this case, a plurality of CSI-IM resource sets may be configured, and one of the corresponding configurations may be indicated by dynamic signaling as described below. That is, if the CSI-IM resource sets are configured, 'CSI-IM resource selection from K CSI-IM resources' may be replaced with 'CSI-IM resource set selection from K CSI-IM resource sets' in Dynamic Signaling. Similarly, one resource set may be configured, so that all CSI-IM resources configured in the later-described DCI field by L2 signaling may be used. In this case, restriction of the number of CSI-IM resources included in one CSI-IM resource set may be determined by other factors such as requirements for the payload of a CSI feedback or a CSI feedback time (particularly, in the case of a CSI feedback for a self-contained structure).

Or the number of resources to be used, K may be implicitly defined by other parameters. For example, a different K value may be determined according to the number of analog beams (separately configured) in the eNB (i.e., the number of beams to be swept for beam management in the eNB). In this case, K aperiodic CSI-IM configurations may be used in an aperiodic CSI-IM configuration order configured by the L3 signaling. In this case, L2 signaling is not used.

Herein, ICSI-RS resources to be used may be separately configured in a similar manner. Particularly in this case, resources to be used for ICSI-RSs and resources to be used for CSI-IMs may be configured separately from among the CSI-IM resources configured by the above L3 signaling procedure, and if another signaling (e.g., a beam ID) is needed to detect an NZP-RS sequence of the ICSI-RSs is needed in this procedure, the corresponding parameter may also be configured.

In this procedure, it may be configured whether specific resources are to be used semi-persistently. Among the CSI-IM resources configured in the above L3 signaling procedure, resources to be used for semi-persistent CSI-IM and resources to be used for one-shot CSI-IM may be separately configured. If a period for semi-persistent CSI-IM is needed in this procedure (i.e., if the period has not been predefined or has not been configured by the later-described dynamic signaling), the period may be configured additionally.

3.3. Dynamic Signaling for Aperiodic CSI-IM Indication

The eNB may indicate to the UE by L1 signaling such as DCI whether an aperiodic CSI-IM should be measured, and which resources should be measured from among K (or M) aperiodic CSI-IM resources selected in the above procedures described in 3.1 and 3.2. The UE calculates/reports CSI by using interference in an aperiodic CSI-IM indicated by an 'aperiodic CSI-IM indication' of $n_{IMR}$ bits in UE-specific DCI, among the K (or M) aperiodic CSI-IMs. Herein, one of the states of the 'aperiodic CSI-IM indication' indicates no aperiodic CSI-IM measurement. In this case, a CSI-IM measurement result is not used in CSI calculation. If only one CSI-IM is to be used for CSI calculation, $n_{IMR}$ may be set to be equal to or less than $\lfloor \log_2(K_{MAX}+1) \rfloor$ where $K_{MAX}$ is the maximum value of K.

If K aperiodic CSI-IM resource sets are configured by higher-layer signaling such as L3/L2 signaling, L1 signaling indicates to the UE that one of the K aperiodic CSI-IM resource sets is selected, and resources in the corresponding aperiodic CSI-IM resource set are used in measuring interference for a CSI feedback. In this case, a CSI-IM and an ICSI-RS may be included in on set, which may be configured by higher-layer signaling. In a special case, if K=1, that is, only one set is configured, it may be indicated to the UE by a 1-bit aperiodic CSI-IM indication whether an aperiodic CSI-IM is to be measured by using the corresponding aperiodic CSI-IM resource set.

If $K_1$ aperiodic CSI-IMs (sets) and $K_2$ aperiodic ICSI-RSs (sets) are configured by higher-layer signaling, each may be configured by separate signaling in a similar manner to the above.

CSI-IMs (or RE patterns) may be separately configured according to numbers of antenna ports. In this case, the aperiodic CSI-IM indication may indicate a different CSI-IM RE pattern according to the number of antenna ports. For this purpose, the number of antenna ports may be signaled separately, or to reduce overhead, the aperiodic CSI-IM indication and information about the number of antenna ports may be joint-encoded. Or, without additional signaling, the aperiodic CSI-IM indication may be interpreted on the assumption that the same number of antenna ports as the number of antenna ports used for CSI-RSs (signaled separately or predefined) are used.

p_D described in 3.1 may be indicated by DCI, not by higher-layer signaling such as L3 signaling. p_D may be signaled separately or joint-encoded with the aperiodic CSI-IM indication to reduce overhead.

In the case where a sequence initialization factor (when needed, p_D) to be used commonly for CSI-IM resources is predefined or configured separately by L2/L3 signaling, and CSI-IM resources to be used for ICSI-RSs are not defined separately by higher-layer signaling, the eNB may indicate to the UE by L1 signaling such as DCI whether a CSI-IM resource selected for the UE is an ICSI-RS, that is, an interference channel is to be measured by using a sequence initialized using the above sequence initialization factor (when needed, p_D).

For this purpose, the eNB may indicate the index of one of CSI-IM resources selected by higher-layer signaling to the UE by DCI signaling, and the UE may interpret the resource as an ICSI-RS and measure interference in the resource by using a given sequence. The measurement result is used in reporting interference CSI (ICSI) which will be described below. CSI-IM resource indexes may be set according to an order configured by L2/L3 signaling.

If measurement of all of a plurality of CSI-IM resources configured by L2/L3 signaling is to be indicated by DCI, signaling of the ICSI-RSs may be joint-encoded with a corresponding aperiodic CSI-IM indication, for effective use of DCI bits. In an embodiment, the states listed in the following table may be used.

TABLE 5

| State | Description |
| --- | --- |
| 00 | No CSI-IM measurement |
| 01 | CSI-IM measurement, first resource is ICSI-RS |
| 10 | CSI-IM measurement, second resource is ICSI-RS |
| 11 | CSI-IM measurement, No ICSI-RS |

For CSI-IM resources (i.e., ICSI-RS resources) for which a sequence initialization factor (and p_D) have been configured, the eNB may configure the UE to measure the corresponding resources in the same manner as in other CSI-IMs by not indicating that the corresponding resources are ICSI-RSs by DCI. That is, in this case, if in the L3/L3 configuration stage, resources which may potentially be used for ICSI-RSs are configured in the above method, and the corresponding resources are actually to be used for ICSI-RSs, the resources may be indicated as ICSI-RSs to the UE in the above method.

In the case of semi-persistent CSI-IM, CSI-IM transmission may be enabled/disabled in this procedure. While confusion between signalings may be prevented by defining an enable signal and a disable signal separately, the enable/disable signaling is defined integrally for the purpose of reducing signaling overhead, and upon receipt of the signaling, the UE may interpret the signaling as enable/disable of semi-persistent CSI-IM measurement. That is, upon receipt of the above enable/disable indication, the UE may toggle on/off of interference measurement in the corresponding resources.

If semi-persistent CSI-IM is not configured separately by higher-layer signaling, enable/disable of the semi-persistent CSI-IM may be signaled along with a one-shot CSI-IM indication. That is, the following aperiodic CSI-IM indication as illustrated in the following table may be defined.

TABLE 6

| State | Description |
| --- | --- |
| 00 | No CSI-IM measurement |
| 01 | One-shot CSI-IM measurement, Set 1 |
| 10 | One-shot CSI-IM measurement, Set 2 |
| 11 | Semi-persistent CSI-IM measurement, On/off toggle |

If the eNB has not configured a period to be used for semi-persistent CSI-IM by higher-layer signaling, the eNB may transmit information about the period to the UE by L1 signaling.

To reduce additional overhead of DCI, an aperiodic CSI-IM measurement timing may not be signaled additionally. In this case, an aperiodic CSI-IM may be measured at the same time point as predefined (e.g., an aperiodic CSI-RS measurement time). Particularly, in the case of an aperiodic ICSI-RS indication, the aperiodic CSI-IM may be measured at the time of receiving later-described 'aperiodic ICSI triggering'. In this case, without transmission of an aperiodic CSI-IM indication, an aperiodic CSI-IM may be measured according to the aperiodic CSI-IS indication (or an aperiodic CSI request).

Figure 6:
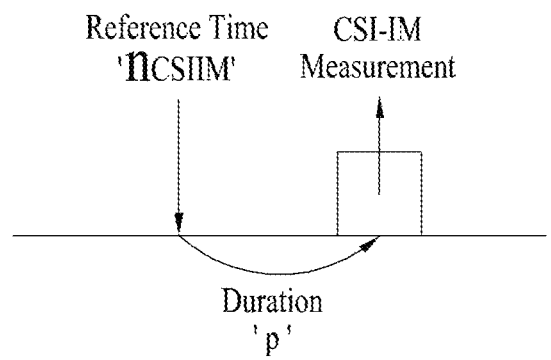
FIGS. 6 and 7 illustrate reference time points and interference measurement time points.
Figure 7:
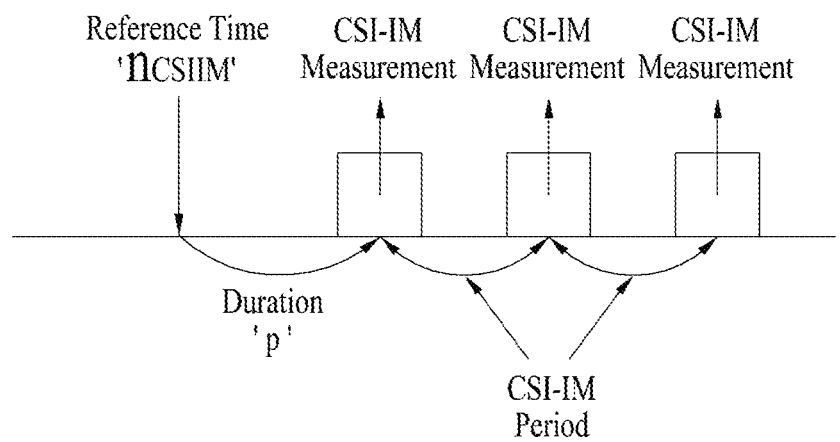

An aperiodic CSI-IM measurement timing may be indicated separately to the UE. For the convenience of description, three time points for aperiodic CSI-IM measurement, that is, a reference time '$n_{CSIIM}$', a duration 'p', and $n_{CSIIM}$+p (or $n_{CSIIM}$−p) may be defined and used, as illustrated in FIG. 6.

With the duration p from the reference time '$n_{CSIIM}$', the eNB indicates to the UE the index of a time point (i.e. $n_{CSIIM}$+p) corresponding to a subframe (or an equivalent time index, for example, a symbol) in which the UE is to measure an aperiodic CSI-IM within a predefined set.

The reference time '$n_{CSIIM}$' may be defined as follows. In each case, a range of p is defined differently as follows.

Aperiodic CSI-IM indication time-based: in this case, a CSI-IM measurement time may be $n_{CSIIM}$+p where p may be limited to a non-negative integer. If the UE is to use a previous CSI-IM measurement result in CSI calculation, p may also include a negative integer.

ACSI-RS time-based (same DCI): in this case, a CSI-IM measurement time may be $n_{CSIIM}$+p where p may be any of the total integers.

Reporting time-based: in this case, p may be limited to a non-negative integer, and a CSI-IM measurement time may be $n_{CSIIM}$−p instead of $n_{CSIIM}$+p.

That is, DCI indicates the 'p' value to the UE, and the UE measures a signaled aperiodic CSI-IM according to the predefined reference time 'n' and the aperiodic CSI-IM measurement time $n_{CSIIM}$+p (or $n_{CSIIM}$−p).

Particularly, a set of p values may be predefined, and an index $I_p$ indicating a value selected from the set may be transmitted to the UE. That is, a set of p values, that is, durations may be defined as {0, 1, 2, 4}, and if $I_p$=3, the UE may understand that p=4. The set of durations may be predefined or configured for the UE by higher-layer signaling such as RRC signaling.

It may be indicated to the UE by DCI whether $n_{CSIIM}$ and p are interpreted as subframe indexes, symbol indexes, or other time indexes. Or what time indexes $n_{CSIIM}$ and p are interpreted as according to services used by the UE may be defined. For example, if ultra-reliable low latency communication (URLLC) is used, $n_{CSIIM}$ and p may be interpreted in symbols, and otherwise, as other time indexes, for example, in subframes.

In the case of semi-persistent CSI-IM, the UE may understand that on/off of CSI-IM measurement is signaled at the time $n_{CSIIM}+p$ (or $n_{CSIIM}-p$). Particularly, triggering may be a toggling scheme. In this case, when the UE is not measuring a semi-persistent CSI-IM, the semi-persistent CSI-IM measurement of the UE lasts from the time $n_{CSIIM}+p$ (or $n_{CSIIM}-p$) to the time $n_{CSIIM}+p$ (or $n_{CSIIM}-p$) of the next semi-persistent CSI-IM indication. At the same time, it may be interpreted that a transmission offset of CSI-IM is applied to the time $n_{CSIIM}+p$.

If a plurality of aperiodic CSI reports are not defined for one semi-persistent CSI-IM, when a semi-persistent CSI-IM is transmitted, signaling for MR on/off (if MR is on, the measurement results of corresponding resources are used independently at each measurement, without being averaged across subframes/slots) is not defined. Rather, (aperiodic) CSI request signaling may be used as signaling for off of semi-persistent CSI-IM. That is, it is assumed that a CSI-IM indication and a (aperiodic) CSI request are transmitted in both one-shot CSI-IM and semi-persistent CSI-IM. In one-shot CSI-IM, a CSI-IM indication and a (aperiodic) CSI request may be transmitted in the same subframe, whereas in semi-persistent CSI-IM, a CSI-IM indication and a (aperiodic) CSI request may be transmitted in different subframes.

In the absence of a period configuration in a higher-layer configuration for semi-persistent CSI-IM, a period may be signaled to the UE by DCI. The UE may measure a CSI-IM in a subframe whose number $n_{sf}$ satisfies $(n_{sf}-(n_{CSIIM}+p))$ mod $n_p=0$ where a CSI-IM starting time is an offset time $n_{CSIIM}+p$, and $n_p$ is a configured period.

3.4. Feedback Considering Interference Measurement

The UE may largely take the following Option 1 and Option 2 according to CSI-IM measurement schemes.

Option 1. CSI-IM Power Measurement

The UE measures interference power in a CSI-IM resource. The interference power means interference that a TRP attached to the UE cannot or will not control. The UE may use an SINR calculation scheme for the measured interference, and thus report the interference measurement in CSI to the eNB. That is, the UE may calculate CSI, particularly a CQI based on an SINR calculated by $$SINR = \frac{Desired signal}{interference + noise}$$

and report the CSI to the eNB. For this purpose, at least one CSI-RS measurement should accompany.

Figure 8:
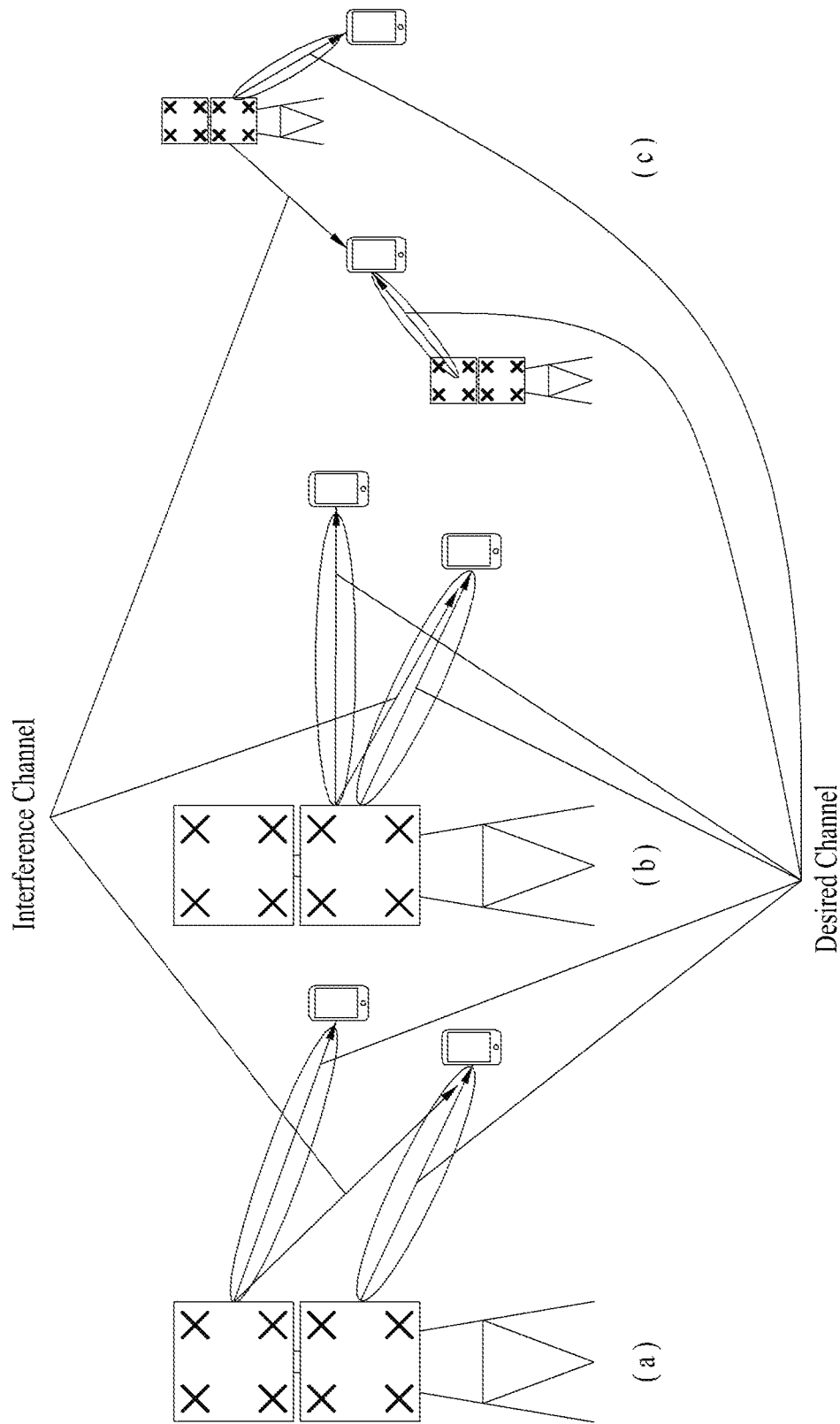
FIG. 8 illustrates multiple interference situations which a user equipment (UE) may be placed.

The eNB may transmit a signal similar to interference in a CSI-IM resource so that the UE may measure the intensity of expected interference. Herein, the following interference situations may be given. FIG. 8 illustrates these interference situations.

① Interference with UE using different analog beam
② Interference with another UE using the same analog beam
③ Interference with transmission of a different TRP Particularly, ③ interference from transmission from another TRP in FIG. 8 may be considered. Therefore, calculation of CSI for a plurality of CSI-IMs may amount to calculation and reporting of CSI for a plurality of different interference assumptions. The UE may calculate and report CSI for each interference assumption. Herein, the UE may also report CSI for an interference-free situation in which a CSI-IM measurement result is not used. This is based on aperiodic CSI reporting. In this case, it may be assumed that feedback payload for reporting all pieces of CSI is sufficient. If the UE is to reduce feedback overhead (e.g., for the case where feedback payload is limited, for example, when a periodic feedback is performed temporarily like periodic but multi-shot), the UE may additionally report a delta-CQI for each interference assumption with respect to a CQI for an interference-free situation, that is, a variation with respect to the CQI for the interference-free situation, or report each CQI (or CQI variation) on the assumption that the eNB uses the same PMI in all cases.

Or the UE may report CSI based on a corresponding interference assumption along with the index of a CSI-IM that leads to a best CQI (also, along with CSI for the interference-free situation in which a CSI-IM measurement result is not used), or NIA pieces of CSI based on corresponding interference assumptions along with corresponding CSI-IM indexes, for CSI-IMs which lead to best NIA CQIs.

Option 2. Interference Channel Measurement

In the case where when the UE measures a CSI-IM, the corresponding resource is signaled as an ICSI-RS to the UE, the UE may measure the corresponding CSI-IM resource, particularly an interference channel by using a given sequence, and report the measurement to the eNB at an aperiodic CSI report timing through an aperiodic CSI request. In this case, the UE measures interference controllable by the eNB. The interference may be ① or ② in FIG. 8, particularly inter-panel interference such as ①.

There may be an indicator for requesting an ICSI feedback, aside from an aperiodic CSI request. The eNB may transmit an indicator of 'ICSI feedback request' in DCI carrying an aperiodic CSI request, and upon receipt of the indicator, the UE reports to the eNB the result of interference channel measurement in an ICSI-RS indicated by other signaling (e.g., RRC signaling or dynamic signaling in DCI) according to the corresponding field. In this case, signaling (e.g., a feedback timing indication, and so on) related to the ICSI feedback request may be transmitted along with the ICSI feedback request.

This ICSI feedback request may be tied to the ICSI-RS indication, and signaled to thereby trigger measurement and reporting simultaneously.

An interference channel measurement may be reported by an explicit feedback or an implicit feedback.

Alt. 1 Explicit Feedback

The UE directly reports channel information about measured interference. This value is a quantized value of each element of an interference channel eigenvector(s), each element of a covariance matrix eigenvector, or a channel coefficient. The power and phase of each element may be quantized and transmitted, and to reduce feedback overhead, only the phase may be reported.

To more accurately report the effect of each interference channel, a value indicating the intensity of the interference channel may be quantized and reported to the eNB. The reported interference channel intensity may be the following values.

An eigenvalue of a channel covariance matrix (likewise, an eigenvalue^2 of a channel matrix)

$$INR = \frac{interferencePower}{noisePower} \text{ for a noise-limited environment}$$

$$SIR = \frac{DesiredSignalPower}{interferencePower} \text{ for an interference-limited environment}$$

A rank may be fixed to a specific value (e.g., 1), a maximum rank may be fixed, or a rank may be configured by higher-layer signaling such as RRC signaling. Or in the case of a channel eigenvector feedback, a threshold may be set for an eigenvalue^2 for each eigenvector, and an eigenvector set corresponding to an eigenvalue^2 exceeding the threshold may be reported to the eNB. Similarly, in the case of an eigenvector feedback for a channel covariance matrix, the eigenvalue of the channel covariance matrix may play the same role.

On the contrary, an eigenvector corresponding to the smallest eigenvalue and the eigenvalue may be reported. This implies that the UE reports a channel having least interference with the UE to the eNB. In this case, an opposite reference to the above method may be set. For example, in the case of a channel eigenvector feedback, a threshold may be set for an eigenvalue^2 for each eigenvector, and an eigenvector set corresponding to an eigenvalue^2 less than the threshold may be reported to the eNB. Similarly, in the case of an eigenvector feedback for a channel covariance matrix, the eigenvalue of the channel covariance matrix may play the same role.

Alt 2. Implicit Feedback

The UE may report a precoding index (or precoding indexes) which leads to the most interference with the UE to the eNB. That is, the eNB is recommended to use a precoder most orthogonal to the corresponding precoding (set) without using the precoding corresponding to the reported index(es). Herein, a precoder may use a transmission codebook used in LTE or NR.

To more accurately report the effect of each interference channel, a value indicating the intensity of the interference channel may be quantized and reported to the eNB. The reported interference channel intensity may be the following values.

$$INR = \frac{interferencePower}{noisePower} \text{ for a noise-limited environment}$$

$$SIR = \frac{DesiredSignalPower}{interferencePower} \text{ for an interference-limited environment}$$

A rank may be fixed to a specific value (e.g., 1), a maximum rank may be fixed, or a rank may be configured by higher-layer signaling such as RRC signaling. Or if the eNB is to receive a report of interference with a high INR, a threshold may be set for INR, and an interference precoder (set) corresponding to an INR higher than the threshold may be reported to the eNB. On the contrary, if the eNB is to receive a report of interference with a low SIR, a threshold may be set for SIR, and an interference precoder (set) corresponding to an SIR less than the threshold may be reported to the eNB.

On the contrary, the UE may report a precoding index which may cause least interference to the UE to the eNB. In this case, the eNB may use the precoder reported by the UE in supporting a UE using a channel represented by a corresponding IMR (e.g., a precoder reported by UE a may be used to support UE b in FIG. 5).

In this case, in the case where a precoder number to be reported is determined based on a threshold, if the eNB is to receive a report of high-SIR interference, a threshold may be set for the SIR, and an interference precoder set corresponding to an SIR exceeding the threshold may be reported to the eNB. In the opposite case, if the eNB is to receive a report of low-INR interference, a threshold may be set for the INR, and an interference precoder set corresponding to an INR less than the threshold may be reported to the eNB.

A precoder used for interference reporting may be different from a codebook used for a desired channel. For example, regarding a class A codebook, O1 and O2 (N1 and N2 as needed) of a codebook to be used for a feedback of interference channel measurement may be configured individually.

The following embodiments may be considered by using the foregoing configuration methods, Alt 1, and Alt 2. For clarity, it is made clear that an NZP-CSI-RS is an RS resource for measuring a desired channel of a UE, an ICSI-RS is an RS resource for measuring an interference channel of the UE, and a CSI-IM is a resource for measuring interference power.

Embodiment 1

RRC configuration: one NZP CSI-RS, one ICSI-RS, M CSI-IM resource candidates

MAC configuration: K CSI-IM sets from among M CSI-IM resource candidates

DCI signaling: indicate K CSI-IM sets

The UE may measure CSI for K interference assumptions, and measure an interference channel in ICSI-RS resources. Particularly, K=1 or M=1.

If an ICSI-RS indication is given separately, an ICSI-RS may be measured separately from CSI-IM measurement, and interference channel information may be reported in the following method.

Embodiment 2

RRC configuration: one NZP CSI-RS, M CSI-IM resource candidates

MAC configuration: K CSI-IM resources from among M CSI-IM resource candidates

DCI signaling: indicate $K_1$ ICSI-RSs and $K_2$ CSI-IMs

The eNB indicates $K_1$ ICSI-RSs and $K_2$ CSI-IMs by DCI. The UE may measure CSI for $K_2$ CSI-IM interference assumptions, and measure an interference channel in $K_1$ ICSI-RS resources. Particularly, $K_1$ and $K_2$=1.

Embodiment 3

RRC configuration: one NZP CSI-RS, M CSI-IM resource candidates

MAC configuration: K CSI-IM sets including $K_1$ ICSI-RSs, and $K_2$ CSI-IM resources from among M CSI-IM resource candidates DCI signaling: indicate one CSI-IM set The UE may measure CSI for $K_2$ CSI-IM interference assumptions included in a signaled CSI-IM set, and measure an interference channel in $K_1$ ICSI-RS resources. Particularly, $K_1$ or $K_2$=1.

Embodiment 4

RRC configuration: one NZP CSI-RS, M CSI-IM resource candidates

MAC configuration: $K_1$ ICSI-RS sets including a plurality of ICSI-RS resources from among M CSI-IM resource candidates, and $K_2$ CSI-IM resource sets including a plurality of CSI-IM resources DCI signaling: indicate one ICSI-RS set and one CSI-IM set The UE may measure CSI for CSI-IM interference assumptions included in a signaled CSI-IM set, and measure an interference channel in ICSI-RS resources included in an ICSI-RS set.

Figure 9:
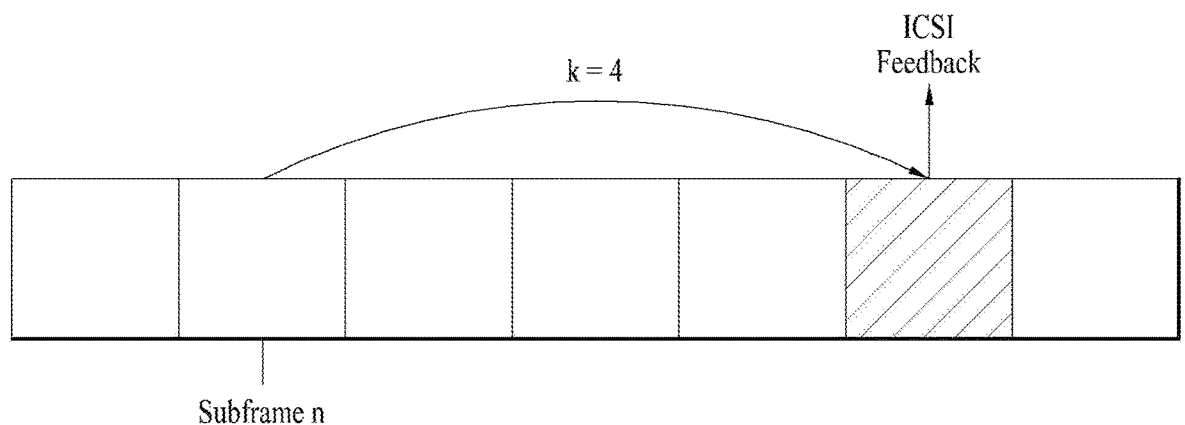
FIGS. 9, 10, 11, and 12 illustrate feedbacks in response to a channel state information-interference measurement (CSI-IM) indication or a CSI request.

If ICSI is reported at a separate timing, the eNB may separately indicate an ICSI feedback timing to the UE. If the UE receives a (aperiodic) CSI request (or ICSI feedback request) indicating ICSI reporting in subframe n, the eNB may configure the UE to report ICSI at time n+k. FIG. 9 illustrates an ICSI feedback time. Herein, k within a defined set may be indicated to the UE by an 'ICSI feedback timing indicator'. A set of k values may be predefined or configured by higher-layer signaling such as RRC signaling. Particularly in this case, a different processing time is expected according to the number of CSI-IMs, the total number of interference antenna ports, and use of a wideband/subband, and thus a different set of k values may be defined according to each criterion.

k may be predefined as a specific single value or configured by higher-layer signaling such as RRC signaling. Particularly, in this case, a different k value may be defined according to the number of CSI-IMs, the total number of interference antenna ports, and use of a wideband/subband.

If k for a feedback timing is defined to be counted from an aperiodic CSI request timing, it may be different from a time required to calculate ICSI using an actual CSI-IM. Therefore, k may be defined as a time spanning from a CSI-IM measurement timing to an ICSI feedback time. Herein, the following situations may be considered depending on whether a CSI-IM indication is separated from an aperiodic CSI request.

Case 1. A CSI-IM measurement time is a time after reception of an aperiodic CSI request.

Figure 10:
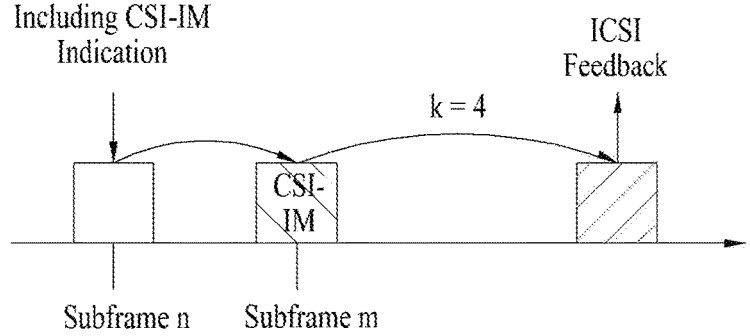

FIG. 10 illustrates such an example. k may be defined from a CSI-IM transmission time, subframe m, instead of an aperiodic CSI request time, subframe n in an ICSI feedback timing subframe n+k. That is, the ICSI feedback timing is subframe m+k.

Figure 11:
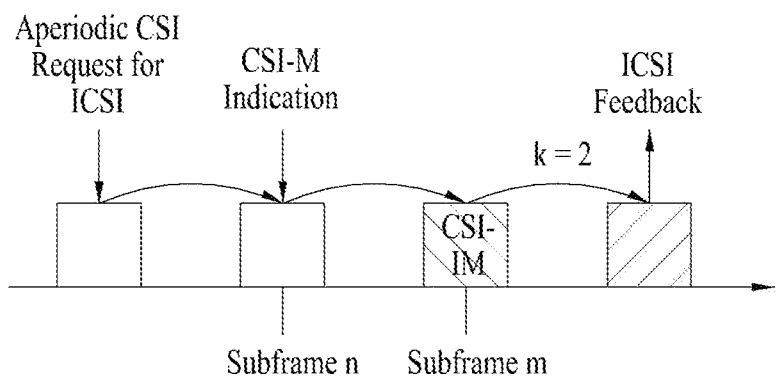

FIG. 11 illustrates a case in which although a CSI-IM indication is transmitted separately in DCI, the DCI is longer than or transmitted after DCI including an aperiodic CSI request. In this case, the ICSI feedback timing is also subframe m+k. However, unlike the example of FIG. 10, the aperiodic CSI request may indicate DCI including information about a corresponding CSI-IM, rather than it directly indicates the CSI-IM being a reference resource.

Case 2. DCI (UL, DL) indicating a CSI-IM separately precedes an aperiodic CSI request.

Figure 12:
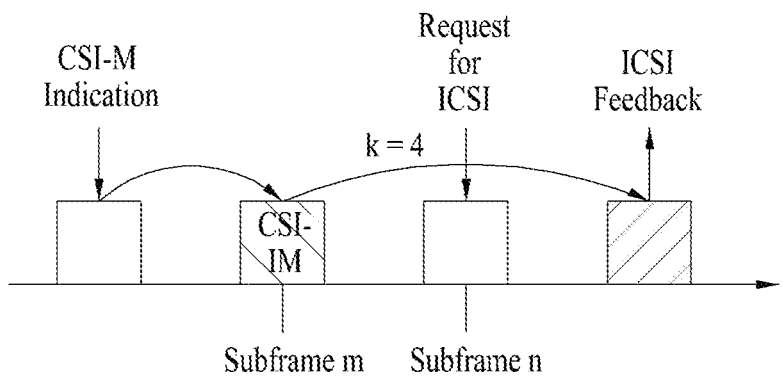

FIG. 12 illustrates such an example.

In this case, characteristically, a CSI-IM measurement timing may precede an aperiodic CSI request. Therefore, subframe m+k may precede subframe n. Thus, in this case, a minimum value of an actual aperiodic CSI reporting time, $k_{min}$ may be defined. Herein, $k_{min}$ may be used as follows.

i. An aperiodic CSI reporting time may be defined as max (m+k, n+1).

ii. If m+k<n+1, ICSI based on a corresponding CSI-IM is not reported.

Commonly to both cases, if the eNB transmits an (aperiodic) CSI request for ICSI along with a feedback time to the UE, a CSI-IM needs to be transmitted at least k subframes before the CSI feedback time. Accordingly, if the eNB triggers ICSI reporting, the UE calculates ICSI by using a CSI-IM transmitted before a corresponding time, without expecting that the CSI-IM is transmitted after ((aperiodic) CSI reporting time-k) (e.g., k subframes before the aperiodic CSI reporting time). If the eNB transmits a CSI-IM after (ICSI reporting time-k), the UE may omit ICSI reporting or report ICSI without updating it.

3.5. One-Shot/Semi-Persistent CSI-IM

Aperiodic CSI-IM is applicable to both CSI-IM and ICSI-RS. In this case, L1 signaling should be separately configured for the transmission/measurement timings of the two CSI-IMs. Further, an aperiodic CSI-IM transmission timing may be decoupled from an aperiodic CSI-RS transmission timing. In other words, L1 signaling may be configured separately for the transmission/measurement timings of an aperiodic CSI-RS, an aperiodic CSI-IM, and an aperiodic ICSI-RS.

In order to reduce DCI overhead, signaling of an NZP CSI-RS, a CSI-IM, and an ICSI-RS may be joint-encoded and transmitted. For a basic resource configuration scheme, the foregoing L2/L3 signaling-based scheme is used. However, an RS group(s) to be indicated by DCI may be configured separately by L2/L3 signaling. Each RS group may include one or more RSs, and one or more of three RS types (i.e., NZP CSI-RS, CSI-IM, and ICSI-RS). Particularly, an RS group including only a CSI-IM or an ICSI-RS without an NZP CSI-RS may be configured.

TABLE 7

| DCI field | Description |
|---|---|
| 00 | No measurement |
| 01 | Measure channel and/or interference in configured RS group 1 |
| 10 | Measure channel and/or interference in configured RS group 2 |
| 11 | Measure channel and/or interference in configured RS group 3 |

Upon receipt of corresponding signaling, the UE performs channel and/or interference measurement in an RS(s) included in a corresponding RS group. This is useful particularly in supporting a case in which a reporting timing and a measurement indication timing need to be decoupled. For example, if aperiodic CSI reporting is performed based on a semi-persistent NZP CSI-RS and a CSI-IM, interference measurement is preferably signaled to the UE, separately from the aperiodic CSI reporting timing. This situation may be useful when the UE is to perform measurement by using another receiver beam for a predetermined time, as is the case where the eNB wants the UE to calculate CSI for another TRP/beam which is not used currently.

In this case, the UE assumes that all of the resources of a corresponding RS group are transmitted at a timing indicated by corresponding DCI signaling.

If RS groups are configured by L3 signaling such as an RRC configuration, and the number of the RS groups is larger than selectable by DCI, as many RS groups as selectable by DCI may be selected by L2 signaling such as a MAC control element (CE).

To reduce additional overhead, the foregoing signal may be joint-encoded with an aperiodic CSI request as illustrated in the following table. Particularly, since an NZP CSI-RS, CSI-IM, and ICSI-RS group should be preconfigured in an aperiodic CSI request, they are preferably selected at one time. This may be useful particularly when aperiodic CSI is to be measured/reported for the same RS group, for example, an aperiodic NZP CSI-RS, CSI-IM, and/or ICSI-RS.

TABLE 8

| DCI field | Description |
| --- | --- |
| 00 | No measurement |
| 01 | CSI report for configured RS group 1 |
| 10 | CSI report for configured RS group 2 |
| 11 | CSI report for configured RS group 3 |

Aperiodic CSI-IM may be classified as follows.

1. One-Shot CSI-IM

A. A CSI-IM is transmitted/measured at a specific time. The one-shot CSI-IM may be used together with a one-shot CSI-RS.

B. In a semi-persistent CSI-RS and one-shot CSI-IM situation, this may be used when CSI to which a different interference assumption is applied at a specific time is to be reported. In this case, CSI may be calculated/reported by using the result of interference measurement in a newly indicated resource, instead of the result of interference measurement in an existing CSI-IM.

2. Semi-Persistent CSI-IM

A. A CSI-IM is measured/transmitted for a predetermined time period. In this case, if an aperiodic CSI request is not given separately, basically, measurements of CSI-IMs may be averaged across a given time period.

Figure 13:
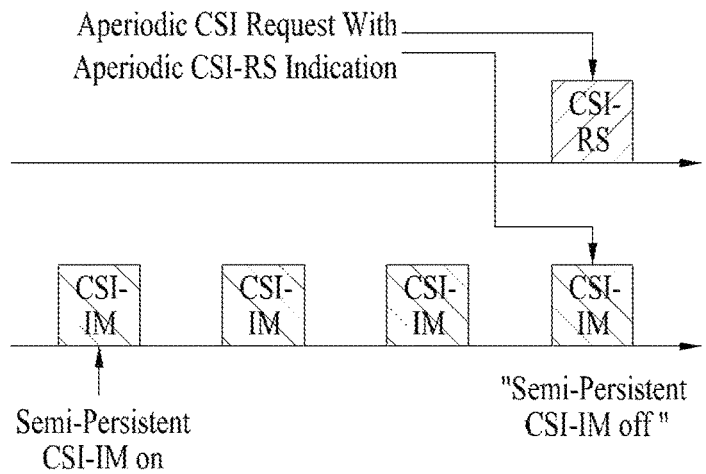
FIG. 13 illustrates a relationship between semi-persistent CSI-IM on/off and an aperiodic CSI request.

B. In a one-shot CSI-RS and a semi-persistent CSI-IM, a semi-persistent CSI-IM may be transmitted preliminarily, interference may be measured for a time period long enough to allow stable interference measurement, and then CSI may be reported along with an aperiodic CSI-RS measurement.

i. As illustrated in FIG. 13, rather than CSI-IM transmission off signaling is not defined separately, a one-shot CSI-RS indication, the ending time of an accompanying semi-persistent CSI-RS, or a (aperiodic) CSI request may be used as semi-persistent CSI-IM transmission off signaling.

C. In a semi-persistent CSI-RS and a semi-persistent CSI-IM, this may be used to set another interference assumption during transmission of a CSI-RS. For example, a semi-persistent CSI-RS and a semi-persistent CSI-IM exist, and CSI is calculated/reported based on the semi-persistent CSI-RS and the semi-persistent CSI-IM. This method may be used when CSI is to be calculated under a new interference assumption at a specific time point. That is, CSI for which a new interference is used from a corresponding time point may be reported, and for this purpose, a semi-persistent CSI-IM indication indicating the new interference assumption may be transmitted together with an aperiodic CSI request by corresponding signaling.

D. It may be used when long-term interference measurement (e.g., SINR-based beam reselection) is needed in a situation such as analog/digital beam reselection.

In this case, use of one-shot CSI-IM and semi-persistent CSI-IM may be limited for different types of CSI-IMs. For example, although one-shot CSI-IM may be used for both interference measurement based on a CSI-IM-based power measurement, and ICSI-RS-based interference channel measurement, semi-persistent CSI-IM may be used only for interference measurement based on a CSI-IM-based power measurement. Therefore, L1 signaling indicating a CSI-IM may include on/off of semi-persistent CSI-IM, whereas L1 signaling indicating an ICSI-RS may not include on/off of semi-persistent ICSI-RS.

The forgoing operations of a UE or an eNB may be used alone or in combination, in actual application.

Figure 14:
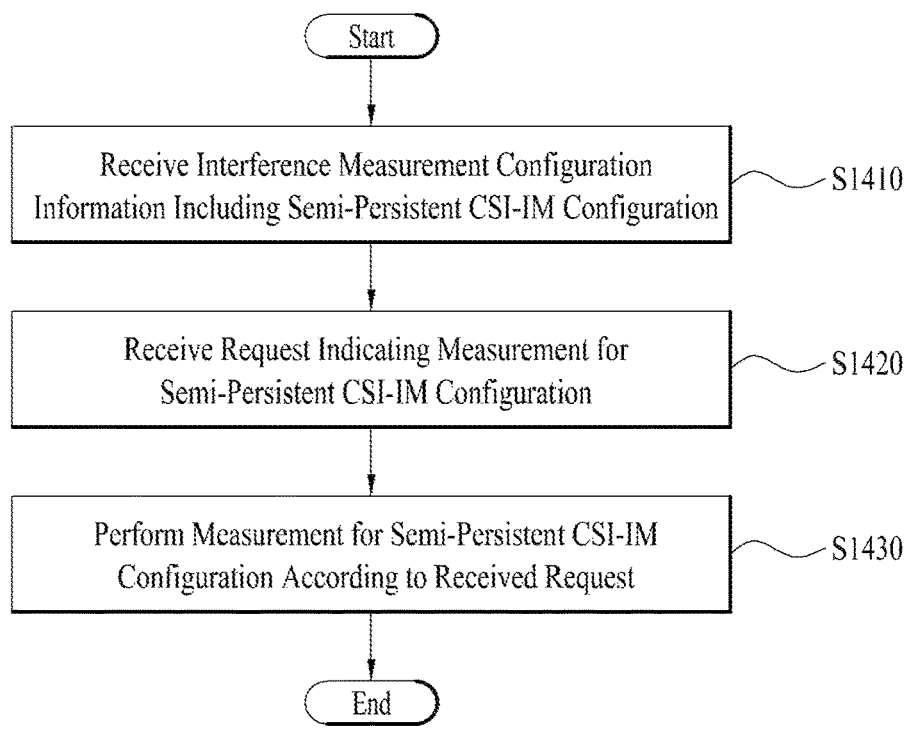
FIG. 14 illustrates an operation of a UE according to an embodiment of the present disclosure.

FIG. 14 illustrates an operation according to an embodiment of the present disclosure. FIG. 14 depicts a method for measuring interference in a wireless communication system. The method is performed in a terminal. The terminal may receive interference measurement configuration information including a semi-persistent CSI-IM configuration (S1410). Then, the terminal may receive a request indicating measurement for the semi-persistent CSI-IM configuration (S1420). The terminal may perform a measurement for the semi-persistent CSI-IM configuration according to the received request (51430). The semi-persistent CSI-IM configuration may indicate CSI-IM with a predetermined period for a predetermined time period.

The terminal may receive information about a time point of starting the measurement of the terminal for the semi-persistent CSI-IM configuration.

The indication of the measurement for the semi-persistent CSI-IM configuration may include a CSI report request or may be received along with the CSI report request. The CSI report request may indicate termination, deactivation, or off of the semi-persistent CSI-IM configuration.

The terminal may receive information about a power compensation value related to the semi-persistent CSI-IM configuration. The power compensation value may be used in the CSI-IM.

In the case where it is determined that the measurement for the semi-persistent CSI-IM configuration is to be reported in a subframe m+k after a predetermined number of (k) subframes from a subframe m in which the indication of the measurement of the semi-persistent CSI-IM configuration is received, when the indication of the measurement of the semi-persistent CSI-IM configuration is received before the CSI report request, a report of measurement for the semi-persistent CSI-IM configuration corresponding to the CSI report request received in subframe m+k or a subsequent subframe may be omitted.

While the embodiments of the present disclosure have been described briefly with reference to FIG. 14, the embodiment related to FIG. 14 may include at least a part of the foregoing embodiments(s) alternatively or additionally.

Figure 15:
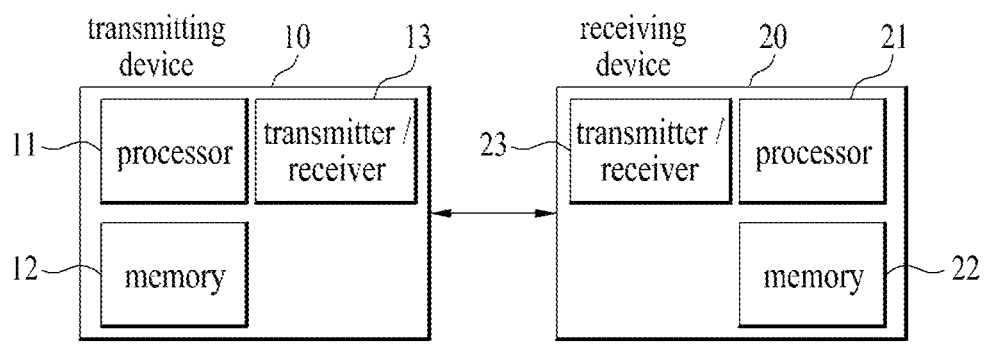
FIG. 15 is a block diagram of apparatuses for implementing the embodiment(s) of the present disclosure.

FIG. 15 is a block diagram of a transmitting device 10 and a receiving device 20 configured to implement exemplary embodiments of the present invention. Referring to FIG. 15, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or the receiving device may be configured as a combination of one or more embodiments of the present invention.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

The invention claimed is:

1. A method for measuring interference in a wireless communication system, performed by a terminal, the method comprising:
   receiving first information for configuring one or more resources for a semi-persistent interference measurement;
   receiving second information for either enabling or disabling the terminal to perform the semi-persistent interference measurement in the one or more resources; and
   performing the semi-persistent interference measurement for the one or more resources configured by the first information, based on the second information,
   wherein the first information includes a periodicity of the one or more resources, and
   wherein the configuration of the one or more resources is applied after a specific time duration from a timing related to reception of the second information.

2. The method according to claim 1, wherein the second information includes a channel state information (CSI) report request, or the second information is received together with the CSI report request.

3. The method according to claim 1, wherein in a case that the semi-persistent interference measurement is to be reported in a subframe #m+k after a predetermined number of (k) subframes from a subframe #m in which the second information is received:
   based on the second information being received before a channel state information (CSI) report request is received:
   a report of the semi-persistent interference measurement related to the CSI report request received in the subframe #m+k or in a subsequent subframe is omitted.

4. A terminal configured to measure interference in a wireless communication system, the terminal comprising:
   a transmitter and a receiver;
   at least one processor; and
   at least one computer memory connected to the at least one processor and storing instructions that, based on being executed by the at least one processor, perform operations comprising:
   receiving first information for configuring one or more resources for a semi-persistent interference measurement;
   receiving second information for either enabling or disabling the terminal to perform the semi-persistent interference measurement in the one or more resources; and performing the semi-persistent interference measurement for the one or more resources configured by the first information, based on the second information, wherein the first information includes a periodicity of the one or more resources, and wherein the configuration of the one or more resources is applied after a specific time duration from a timing related to reception of the second information.

5. The terminal according to claim 4, wherein the second information includes a channel state information (CSI) report request, or the second information is received together with the CSI report request.

6. The terminal according to claim 4, wherein in a case measurement is to be reported in a subframe #m+k after a predetermined number of (k) subframes from a subframe #m in which the second information is received:

based on the second information being received before a channel state information (CSI) report request is received:

a report of the semi-persistent interference measurement related to the CSI report request received in the subframe #m+k or in a subsequent subframe is omitted.

7. A processing device configured to control a terminal to measure interference in a wireless communication system, the processing device comprising:

at least one processor; and at least one computer memory connected to the at least one processor and storing instructions that, based on being executed by the at least one processor, perform operations comprising:

receiving first information for configuring one or more resources for a semi-persistent interference measurement;

receiving second information for either enabling or disabling the terminal to perform the semi-persistent interference measurement in the one or more resources; and performing the semi-persistent interference measurement for the one or more resources configured by the first information, based on the second information, wherein the first information includes a periodicity of the one or more resources, and wherein the configuration of the one or more resources is applied after a specific time duration from a timing related to reception of the second information.

8. The processing device according to claim 7, wherein the second information includes a channel state information (CSI) report request, or the second information is received together with the CSI report request.

9. The processing device according to claim 7, wherein in a case that the semi-persistent interference measurement is to be reported in a subframe #m+k after a predetermined number of (k) subframes from a subframe #m in which the second information is received:

based on the second information being received before a channel state information (CSI report request is received:

a report of the semi-persistent interference measurement related to the CSI report request received in the subframe #m+k or in a subsequent subframe is omitted.

\* \* \* \* \*